US012681679B2

(12) United States Patent
Zhang et al.

(10) Patent No.: US 12,681,679 B2
(45) Date of Patent: Jul. 14, 2026

(54) GESTURES FOR SWITCHING AUDIO ENDPOINTS

(71) Applicant: Hewlett-Packard Development Company, L.P., Spring, TX (US)

(72) Inventors: Peter Siyuan Zhang, Spring, TX (US); King Sui Kei, Spring, TX (US); Yun David Tang, Spring, TX (US); Lan Wang, Spring, TX (US); Alan Man Pan Tam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 18/560,793

(22) PCT Filed: Jun. 8, 2021

(86) PCT No.: PCT/US2021/036391
§ 371 (c)(1),
(2) Date: Nov. 14, 2023

(87) PCT Pub. No.: WO2022/260655
PCT Pub. Date: Dec. 15, 2022

(65) Prior Publication Data
US 2024/0281194 A1      Aug. 22, 2024

(51) Int. Cl.
*G06F 3/16*      (2006.01)
*G06F 3/01*      (2006.01)
*G06V 40/20*      (2022.01)

(52) U.S. Cl.
CPC ................ *G06F 3/16* (2013.01); *G06F 3/017* (2013.01); *G06V 40/28* (2022.01)

(58) Field of Classification Search
None
See application file for complete search history.

(56) References Cited

U.S. PATENT DOCUMENTS

| | | | |
|---|---|---|---|
| 6,353,764 B1 | 3/2002 | Imagawa et al. | |
| 9,348,422 B2 | 5/2016 | Fagadar-Cosma et al. | |
| 9,513,776 B2 | 12/2016 | Webb et al. | |
| 11,750,733 B2* | 9/2023 | Huang ................. | G06F 1/1686 348/14.02 |
| 2010/0169842 A1 | 7/2010 | Migos | |
| 2015/0262005 A1* | 9/2015 | Ohmura ................ | G06F 3/011 348/77 |
| 2016/0291700 A1 | 10/2016 | Geisner et al. | |
| 2018/0054510 A1* | 2/2018 | Rostaing ................. | G06F 3/00 |
| 2018/0158461 A1 | 6/2018 | Wolff et al. | |

(Continued)

FOREIGN PATENT DOCUMENTS

| | | |
|---|---|---|
| CN | 111316669 A | 6/2020 |
| CN | 111831120 A | 10/2020 |

(Continued)

*Primary Examiner* — Hemant S Patel
(74) *Attorney, Agent, or Firm* — Quarles & Brady LLP

(57) ABSTRACT

An example system includes an image sensor, a plurality of audio endpoints, and an electronic device comprising a controller. The controller is to receive images of a user's face from the image sensor. In addition, the controller is to detect, in the images, a gesture of the user to point to a feature on the user's face. Further, the controller is to transition between use of the plurality of audio endpoints in response to detecting the gesture.

17 Claims, 5 Drawing Sheets

(56) References Cited

U.S. PATENT DOCUMENTS

| | | | | |
|---|---|---|---|---|
| 2018/0349087 | A1 | 12/2018 | Park et al. | |
| 2019/0019515 | A1 | 1/2019 | Kim et al. | |
| 2019/0384406 | A1* | 12/2019 | Smith | G06V 40/113 |
| 2020/0077193 | A1* | 3/2020 | Xiang | H04R 3/005 |
| 2021/0211823 | A1* | 7/2021 | Shani | G06F 3/165 |

FOREIGN PATENT DOCUMENTS

| | | | |
|---|---|---|---|
| JP | 2008-182455 A | 8/2008 | |
| WO | 2021/026281 A1 | 2/2021 | |

* cited by examiner

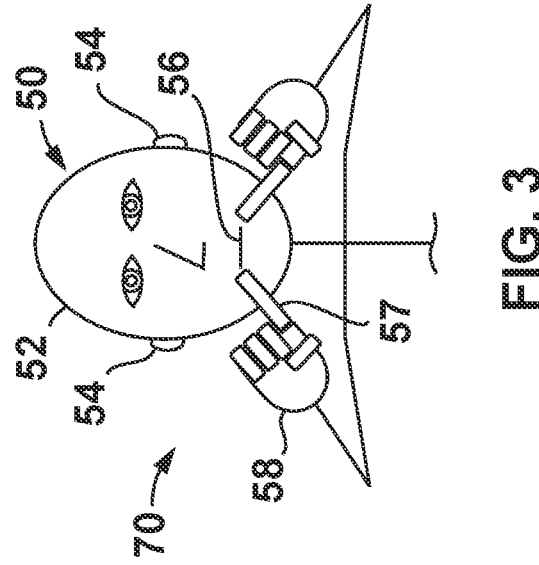
FIG. 3
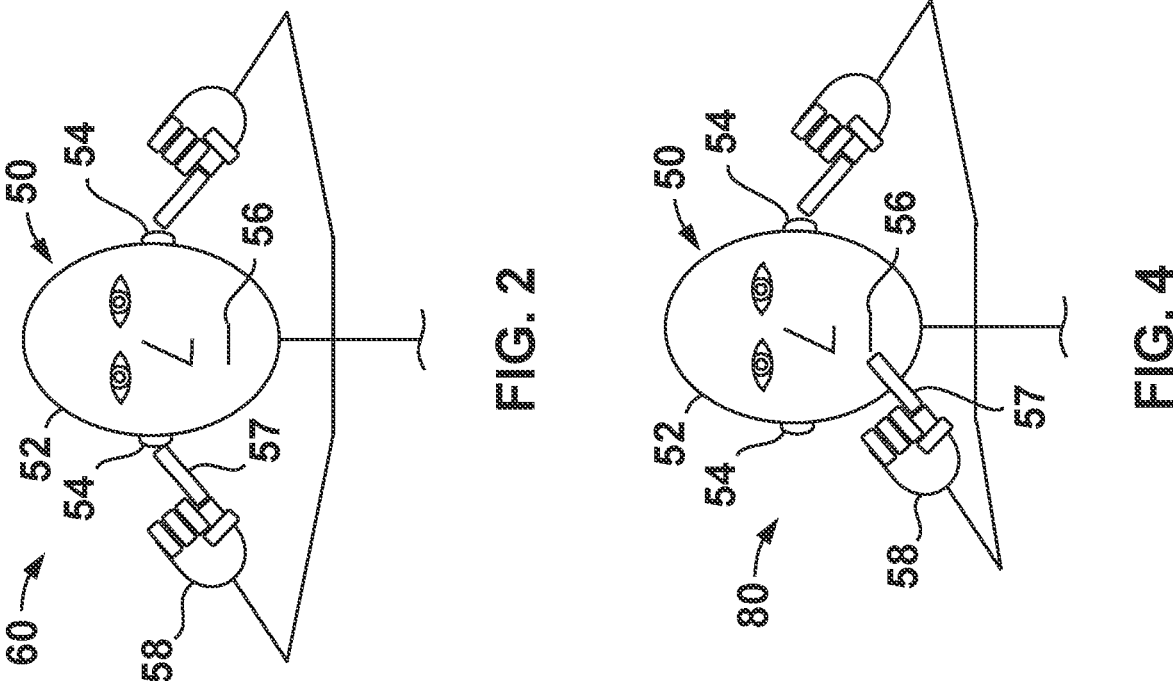
FIG. 2
FIG. 4

200

18

202 — Detect a feature of a user's face in images captured by an image sensor

204 — Detect a gesture of the user to indicate the feature

206 — Select an audio endpoint for use in response to detecting the gesture

GESTURES FOR SWITCHING AUDIO ENDPOINTS

BACKGROUND

An electronic device may include or be coupled to audio endpoints for receiving or outputting sound. The audio endpoints may include audio output endpoints, such as speakers, that are to emit sound into the environment surrounding the electronic device. The audio endpoints may also include audio input endpoints, such as microphones, that are to capture or receive sound signals from the environment surrounding the electronic device.

BRIEF DESCRIPTION OF THE DRAWINGS

Various examples will be described below referring to the following figures:

FIGS. 2-4 are schematic diagrams of a plurality of gestures performed by a user that a controller of the electronic device of FIG. 1 may recognize according to some examples;

DETAILED DESCRIPTION

An electronic device may include or be coupled to multiple audio endpoints, such as a plurality of audio output endpoints and/or a plurality of audio input endpoints. In some circumstances, a user may intend to utilize one of the audio endpoints to the exclusion of the others; however, the electronic device may not have the user-intended audio endpoint selected for use. For instance, in some examples, a user may intend to have sound signals from the electronic device emitted from a head-set speaker rather than the on-board speakers of the electronic device. However, in some circumstances, switching or selecting an audio endpoint may involve menu selections that are difficult to navigate for the user.

Accordingly, the examples disclosed herein include systems and methods for switching between multiple audio endpoints for an electronic device using gestures that are detected using an image sensor. In some examples, the image sensor may capture images of the user's face, and the user may point or otherwise indicate a recognized facial feature on the user's face. The electronic device (or a controller thereof) may recognize the gesture indicating the facial feature, and in response, may switch or select the audio endpoint being utilized by the electronic device. Thus, through use of the example systems and methods disclosed herein, a user may more easily and intuitively switch between or select an audio endpoint for an electronic device.

Figure 1:
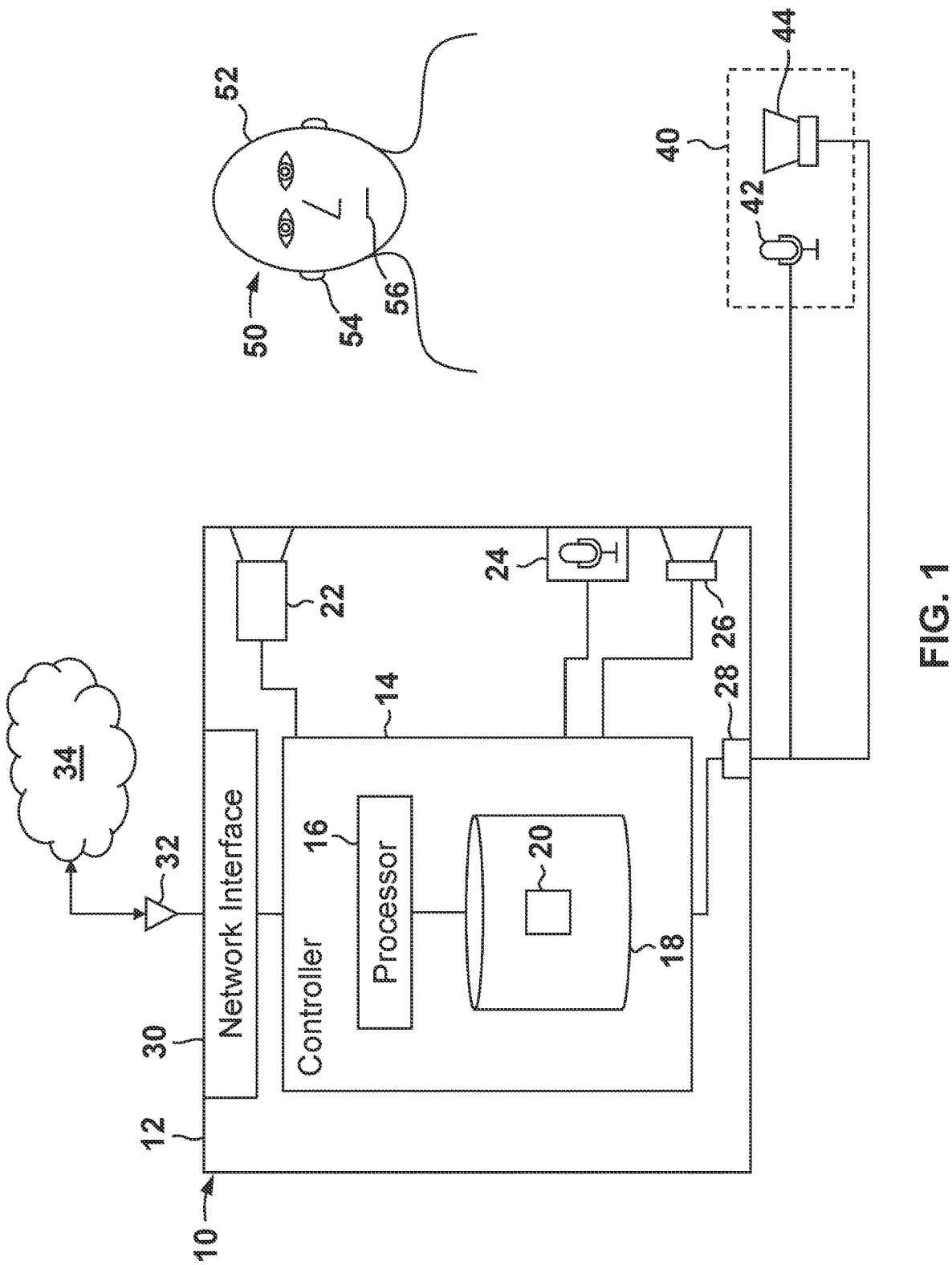
FIG. 1 is a schematic diagram of an electronic device for switching between use of a plurality of audio endpoints in response to recognizing gestures according to some examples.

Referring now to FIG. 1, an electronic device 10 for selecting an audio endpoint via gesture recognition according to some examples is shown. The electronic device 10 may include any suitable device that may execute machine-readable instructions. In some examples, an electronic device 10 for executing a video conference may comprise, for instance, a computer (e.g., a desktop computer, a laptop computer, a tablet computer, an all-in-one computer), a smartphone, etc. Electronic device 10 includes a housing 12. In addition, electronic device 10 includes a controller 14, and a network interface 30. The controller 14 may comprise a processor 16 and a memory 18.

The processor 16 may comprise any suitable processing device, such as a microcontroller, central processing unit (CPU), graphics processing unit (GPU), timing controller (TCON), scaler unit. The processor 16 executes machine-readable instructions (e.g., machine-readable instructions 20) stored on memory 18, thereby causing the processor 16 to perform some or all of the actions attributed herein to the controller 14. In general, processor 16 fetches, decodes, and executes instructions (e.g., machine-readable instructions 20). In addition, processor 16 may also perform other actions, such as, making determinations, detecting conditions or values, etc., and communicating signals. If processor 16 assists another component in performing a function, then processor 16 may be said to cause the component to perform the function.

The memory 18 may comprise volatile storage (e.g., random access memory (RAM)), non-volatile storage (e.g., flash storage, etc.), or combinations of both volatile and non-volatile storage. Data read or written by the processor 16 when executing machine-readable instructions 20 can also be stored on memory 18. Memory 18 may comprise "non-transitory machine-readable medium," where the term "non-transitory" does not encompass transitory propagating signals.

The processor 16 may comprise one processing device or a plurality of processing devices that are distributed within electronic device 10. Likewise, the memory 18 may comprise one memory device or a plurality of memory devices that are distributed within the electronic device 10.

The electronic device 10 may communicate with other devices via a network 34, such as, for instance, the Internet, a telecommunications network, etc. For instance, the network interface 30 may be coupled to an antenna 32 that communicates wirelessly with network 34 (or, more specifically, a node or gateway of network 34). In some examples, network interface 30 may communicate with network 34 via a wired connection (e.g., via Ethernet cable).

In addition, electronic device 10 also includes (or is coupled to) an image sensor 22. As used herein, an "image sensor" may refer to any suitable sensor or sensor array that is to detect images in or outside the visible light spectrum (e.g., infrared, ultraviolet, etc.). In some examples, an image sensor (e.g., image sensor 22) may comprise a camera (e.g., a video camera). In addition, in some examples, an image sensor (e.g., image sensor 22) may capture two-dimensional or three-dimensional images. In some examples, the image sensor 22 may be integrated within housing 12 of the electronic device 10. For instance, in some examples, the image sensor 22 may comprise a user-facing camera of the electronic device 10 (e.g., a user-facing web-cam on a laptop lid, or on a display-side of a tablet computer or smartphone). In some examples, image sensor 22 may be an external image sensor (e.g., that is separate from a housing 12) that is coupled (e.g., via a wireless or wired connection) with the electronic device 10. Thus, during operations, the image sensor 22 may capture images of the user 50 (particularly the user's face 52) of the electronic device 10, and the images captured by the image sensor 22 may be communicated to the controller 14.

Further, electronic device 10 includes a plurality of audio endpoints. In particular, the electronic device 10 includes a microphone 24 and a speaker 26. The microphone 24 may be referred to herein as an "audio input endpoint," because it receives sound signals emitted within the environment surrounding the electronic device 10 and converts these received sound signals into a suitable format for communication to controller 14. For instance, the microphone 24 may receive or capture sound waves associated with the voice of the user 50 during operation. The microphone 24 may be integrated within the housing 12 in some examples and thus may be referred to as an "onboard" audio endpoint (or onboard audio input endpoint); however, in some examples, microphone 24 may comprise an independent body or housing that is separate from the housing 12.

The speaker 26 may be referred to herein as an "audio output endpoint," because it emits sound signals into the environment surrounding the electronic device 10. Speaker 26 may comprise a single speaker or an array of speakers that are to emit sound waves or signals. During operations, speaker 26 may emit sound waves associated with an audio file (e.g., song, voice recording), or may emit an audio stream from a voice conference. The speaker 26 may be integrated within housing 12 in some examples and thus may be referred to as an "onboard" audio endpoint (or onboard audio output endpoint); however, in some examples, speaker 26 may comprise an independent body or housing that is separate from the housing 12.

Referring still to FIG. 1, the electronic device 10 also comprises a communication assembly 28 coupled to (or integrated with) housing 12. In some examples, the communication assembly 28 comprises a port (or plurality of ports) that may be engaged by a suitable connection plug to communicatively couple additional devices to electronic device 10, and particularly to controller 14. In some examples, the communication assembly 28 comprises a wireless connection assembly that may include an antenna (or other suitable device) for establishing a wireless connection (or a plurality of wireless connections) with additional devices. The communication assembly 28 may be coupled to additional audio endpoints for electronic device 10. For instance, as shown in FIG. 1, the communication assembly 28 is coupled to a microphone 42 and a speaker 44 (which may be referred to herein as an "audio input endpoint" and "audio output endpoint," respectively).

The description above for microphone 24 and speaker 26 may be applied to describe the functionality of microphone 42 and speaker 44. However, the microphone 42 and speaker 44 may be coupled to electronic device 10 (and more particularly controller 14) via communication assembly 28. Thus, the microphone 42 and speaker 44 may be referred to as "external" audio endpoints for electronic device 10. For instance, in some examples, the microphone 42 and speaker 44 may be integrated together in a headset 40 that is coupled to electronic device 10 (and controller 14) via communication assembly 28.

Referring still to FIG. 1, during operations, a user 50 may wish to switch between use of various audio endpoints coupled to (or integrated with) the electronic device 10 (e.g., microphones, 24, 42, speakers 26, 44). In particular, the user 50 may be participating in a video conference using the electronic device 10, and may wish to utilize a microphone 42 and/or speaker 44 associated with the headset 40 to send and/or receive, respectively, audio signals to and/or from the video conference. Thus, according to the examples disclosed herein, the user 50 may perform a gesture (or gestures) that are captured by the image sensor 22 and communicated to controller 14. The controller 14 (via processor 16 executing machine-readable instructions 20) may recognize the gesture(s), and in response, switch between the corresponding audio endpoints.

In some examples, the gesture(s) comprise pointing to a particular facial feature on the user's face 52. Thus, controller 14 may initially recognize and locate the particular facial features so as to determine when the user 50 is pointing at them. In particular, the user's face 52 may include a pair of ears 54 and a mouth 56. The controller 14 may detect and locate the ears 54 and mouth 56 of face 52 in the images captured by image sensor 22 using a machine-learning model. For instance, in some examples, the controller 14 may recognize and locate the ears 54 and mouth 56 (and/or other facial features) in the images captured by the image sensor 22 using a neural network (e.g., a two-stage convolutional neural network such as HGR-Net).

In addition to recognizing and locating facial features (e.g., ears 54, mouth 56) on face 52, the controller 14 may also monitor the images captured by image sensor 22 for gestures to indicate the facial features. In particular, the user 50 may indicate the ears 54 and/or mouth 56 by pointing (e.g., with a finger, stylus, etc.) to the elected facial feature during operations.

Referring now to FIGS. 2-4, a plurality of gestures 60, 70, 80 that user 50 may perform to cause controller 14 (FIG. 1) to switch between the audio endpoints (e.g., microphones, 24, 42, speakers 26, 44) during operations are shown. In the gestures 60, 70, 80, the user 50 may point (e.g., with a finger 57 on the user's hand 58) to the user's ears 54 and/or mouth 56. In particular, in a first gesture 60 shown in FIG. 2, the user 50 may point to both (or one) of the user's ears 54. In a second gesture 70 shown in FIG. 3, the user 50 may point (using one of or both of the user's hands 58) to the user's mouth 56. In a third gesture 80 shown in FIG. 4, the user 50 may point both to the user's ear 54 with one hand 58 and to the user's mouth 56 with the other hand 58. Thus, the third gesture 80 may comprise simultaneously performing the first gesture 60 and the second gesture 70.

Referring now to FIGS. 1 and 2, in some examples, the user 50 may perform the first gesture 60. The image sensor 22 may capture images of the user 50 performing the first gesture 60, and communicate the images to the controller 14. The controller 14 may locate and recognize the ears 54 as previously described and may recognize that the user 50 is performing the first gesture 60. In some examples, the controller 14 may recognize and locate the ears 54 and may recognize the first gesture 60 via a machine-learning model (e.g., a neural network) as previously described. Upon recognizing the first gesture 60, the controller 14 may switch between use of the various audio output endpoints coupled to the electronic device 10. In particular, upon recognizing the first gesture 60, the controller 14 may switch between use of the speaker 26 and the speaker 44, such that one of the speakers 26, 44 is deactivated and the other of the speakers 26, 44 is activated.

Referring now to FIGS. 1 and 3, in some examples, the user 50 may perform the second gesture 70. The image sensor 22 may capture images of the user 50 performing the second gesture 70, and communicate the images to the controller 14. The controller 14 may locate and recognize the mouth 56 as previously described and may recognize that the user 50 is performing the second gesture 70. In some examples, the controller 14 may recognize and locate the mouth 56 and may recognize the second gesture 70 via a machine-learning model (e.g., a neural network) as previously described. Upon recognizing the second gesture 70, the controller 14 may switch between use of the various audio input endpoints coupled to the electronic device 10. In particular, upon recognizing the second gesture 70, the controller 14 may switch between use of the microphone 24 and the microphone 42, such that one of the microphones 24, 42 is deactivated and the other of the microphones 24, 42 is activated.

Referring now to FIGS. 1 and 4, in some examples, the user 50 may perform the third gesture 80. The image sensor 22 may capture images of the user 50 performing the third gesture 80, and communicate the images to the controller 14. The controller 14 may locate and recognize the ears 54 and mouth 56 as previously described and may recognize that the user 50 is performing the third gesture 80. In some examples, the controller 14 may recognize and locate the ears 54 and mouth 56 and may recognize the third gesture 80 via a machine-learning model (e.g., a neural network) as previously described. Upon recognizing the third gesture 80, the controller 14 may switch between use of the various audio input endpoints and between use of the various audio output endpoints coupled to the electronic device 10. In particular, upon recognizing the third gesture 80, the controller 14 may switch between use of the microphone 24 and the microphone 42 and between use of the speaker 26 and the speaker 44. As a result, in response to recognizing the third gesture 80, the controller 14 may activate one of the microphones 24, 42 and deactivate the other of the microphones 24, 42, and may activate one of the speakers 26, 44 and deactivate the other of the speakers 26, 44.

Upon recognizing the gestures 60, 70, 80, and switching between use of the various audio endpoints (e.g., speakers 26, 44, microphones 24, 42) the controller 14 may provide an indication to the user 50 that the audio endpoint has been switched according to the recognized gesture 60, 70, 80. For instance, the controller 14 may output a message on a display panel and/or an audible signal via a speaker 26, 44 to indicate that an audio endpoint (or multiple audio endpoints) have been switched.

Thus, by performing the gestures 60, 70, 80 in front of the image sensor 22, the user 50 may easily and quickly switch between use of the various audio endpoints (e.g., microphones 24, 42, speakers 26, 44) without directly engaging (e.g., via a keyboard, mouse, touch input, etc.) the electronic device 10. In addition, depending on which facial feature is being indicated (e.g., pointed to) in the performed gesture 60, 70, 80 the user 50 may selectively switch between use of the audio input endpoints (e.g., microphones 24, 42) and/or the audio output endpoints (e.g., speakers 26, 44) coupled to electronic device 10.

Figure 5:
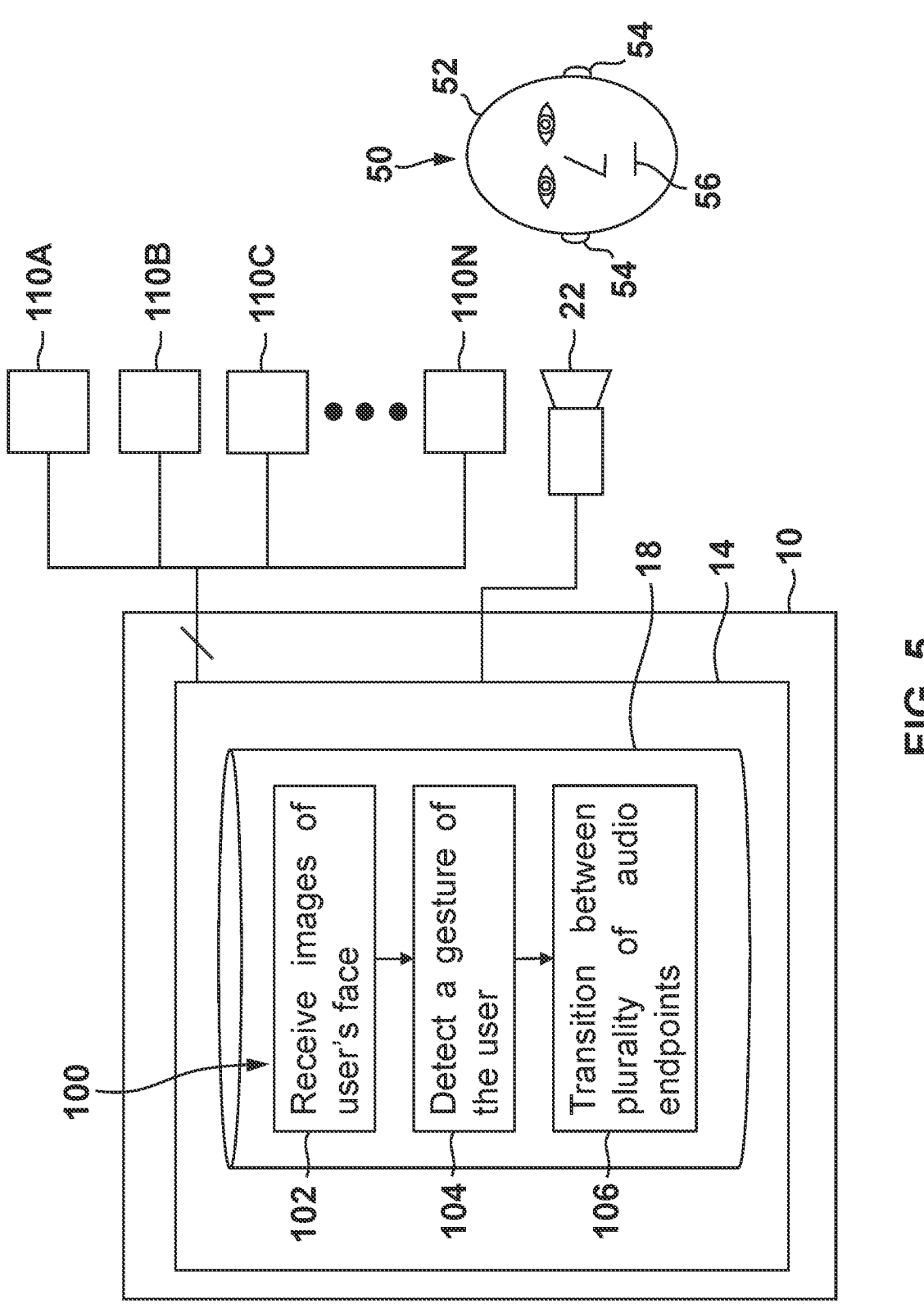
FIG. 5 is a schematic block diagram of a system for switching between use of a plurality of audio endpoints in response to recognizing gestures according to some examples.

Referring now to FIG. 5, example machine-readable instructions 100 that may be stored on memory 18 of controller 14 as machine-readable instructions 20 (or a part thereof) are shown. For convenience, and to simplify the drawings, other features of electronic device 10 and controller 14 are not shown in FIG. 5. However, as previously described, the controller 14 may be coupled to an image sensor 22 and a plurality of audio endpoints 110A, 110B, 110C . . . 110N. The audio endpoints 110A, 110B, 110C . . . 110N may comprise microphones (e.g., microphones 24, 42), speakers (e.g., speakers 26, 44), etc. In describing the features of machine-readable instructions 100, continuing reference will also be made to FIGS. 1-4.

The machine-readable instructions 100 may include receiving images of the user's face 52 at block 102, and detecting a gesture (e.g., gesture 60, 70, 80) of the user 50 at block 104. The controller 14 may receive images of the user's face 52 from the image sensor 22 at block 102. In addition, the controller 14 may detect, using the images captured by the image sensor 22, a gesture of the user 50 to point to a feature (e.g., ears 54 and/or mouth 56) of the user's face 52 at block 104.

In addition, machine-readable instructions 100 include transitioning between use of the plurality of audio endpoints 110A, 110B, 110C . . . 110N in response to detecting the gesture (e.g., gesture 60, 70, 80) at block 106. In some examples, a particular gesture (e.g., gestures 60, 70, 80) detected by the controller 14 at block 104 may cause the controller 14 to select or switch between use of particular ones of the audio endpoints 110A, 110B, 110C . . . 110N. For instance, as previously described, when controller 14 detects a gesture to point to a first facial feature (e.g., ears 54) at block 104, the controller 14 may switch between use of a plurality of audio output endpoints (e.g., speakers 26, 44). Likewise, as previously described, when controller 14 detects a gesture to point to a second facial feature (e.g., mouth 56) at block 104, the controller 14 may switch between use of a plurality of audio input endpoints (e.g., microphone 24, 42).

Figure 6:
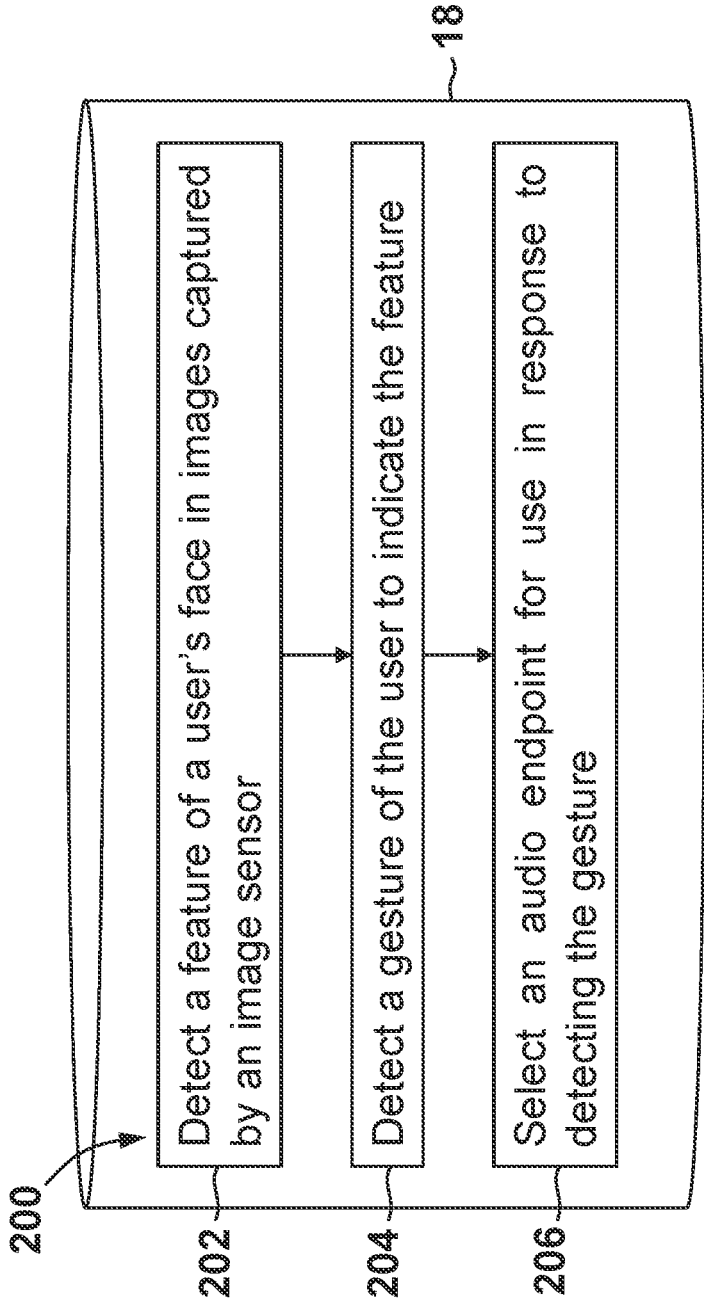
FIG. 6 is a schematic diagram of machine-readable instructions for switching between use of a plurality of audio endpoints in response to recognizing gestures according to some examples.

Referring now to FIG. 6, example machine-readable instructions 200 that may be stored on memory 18 of controller 14 as machine-readable instructions 20 (or a part thereof) are shown. In describing the features of machine-readable instructions 200, continuing reference will also be made to FIGS. 1-4.

Machine-readable instructions 200 include detecting a feature of a user's face in images captured by an image sensor coupled to the electronic device at block 202. For instance, as previously described for electronic device 10 (FIG. 1), the image sensor 22 may capture images of the user's face 52 and communicate the captured images to the controller 14. The controller 14 may then recognize (e.g., via a machine-learning model such as a neural network) facial features (e.g., ears 54, mouth 56) on the user's face 52.

In addition, machine-readable instructions 200 include detecting a gesture of the user to indicate the feature at block 204, and selecting an audio endpoint for use in response to detecting the gesture at block 206. As previously described, the controller 14 may recognize (e.g., using a machine-learning model such as neural network) a gesture (or gestures) (e.g., gestures 60, 70, 80) of the user 50 to indicate (e.g., point to) a recognized facial feature (or features) (e.g., ears 54 and/or mouth 56) in the images captured by the image sensor 22. In response to recognizing the gesture, the controller 14 may then select an audio endpoint (e.g., microphone 24, microphone 42, speaker 26, speaker 44).

Figure 7:
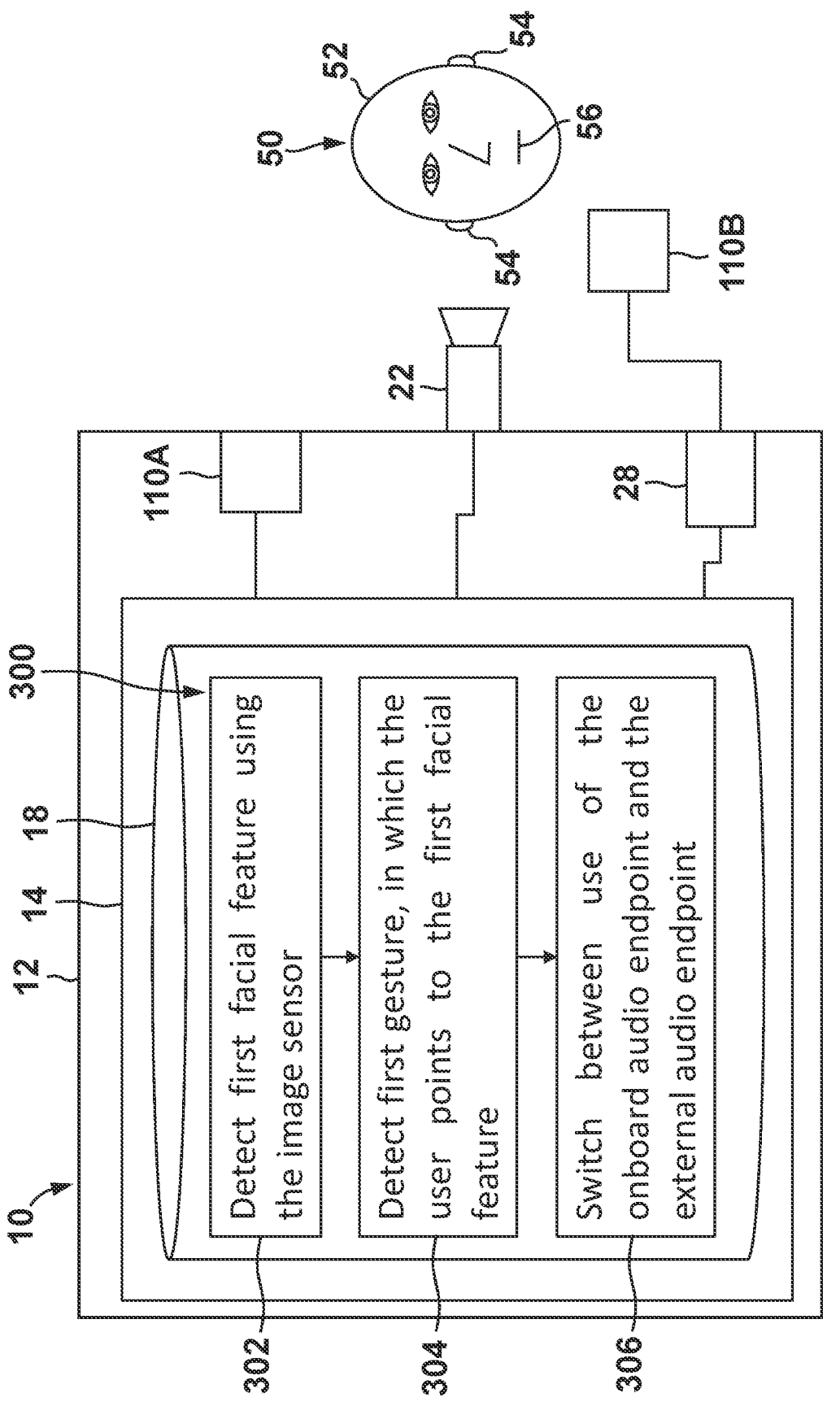
FIG. 7 is a schematic diagram of an electronic device for switching between use of a plurality of audio endpoints in response to recognizing gestures according to some examples.

Referring now to FIG. 7, example machine-readable instructions 300 that may be stored on memory 18 of controller 14 as machine-readable instructions 20 (or part thereof) are shown. For convenience, and to simplify the drawings, other features of electronic device 10 and controller 14 are not shown in FIG. 7. However, as previously described, the controller 14 may be coupled to an image sensor 22, an onboard audio endpoint 110A, and an external audio endpoint 110B. The onboard audio endpoint 110A may be integrated within housing 12 of electronic device 10, and the external audio endpoint 110B may be external to housing 12 and coupled to electronic device 10 via a communication assembly 28 as previously described. In describing the features of machine-readable instructions 300, continuing reference will also be made to FIGS. 1-4.

Machine-readable instructions 300 include detecting a first facial feature of the user 50 using the image sensor 22 at block 302. In some examples, the first facial feature may comprise an ear 54 or the mouth 56 of the user's face 52 as previously described, and the controller 14 may recognize the facial feature in the images from image sensor 22 using a machine-learning model (e.g., neural network). In addition, machine-readable instructions 300 include detecting a first gesture of the user 50 using the image sensor 22, in which the user 50 points to the first facial feature at block 304. For instance, the user 50 may perform the first gesture 60 to point to the ear (or ears) 54, or may perform the second gesture 70 to point to the mouth 56. In either case, the controller 14 may detect the gesture (e.g., gesture 60, 70, 80) using a machine learning model (e.g., neural network).

Further, machine-readable instructions 300 include switching between use of the onboard audio endpoint 110A and the external audio endpoint 110B, via the communication assembly 28, in response to detecting the first gesture at block 306. In particular, in some examples, the controller 14 may recognize that the user 50 has performed the first gesture 60 (FIG. 2) and in response may switch between use of the speaker 26 (e.g., an onboard audio endpoint) and speaker 44 (e.g., an external audio endpoint). Likewise, in some examples, the controller 14 may recognize that the user 50 has performed the second gesture 70 (FIG. 3) and in response may switch between use of the microphone 24 (e.g., an onboard audio endpoint) and microphone 42 (e.g., an external audio endpoint).

The examples disclosed herein include systems and methods for switching between multiple audio endpoints for an electronic device using gestures that are detected using an image sensor. Thus, through use of the example systems and methods disclosed herein, a user may more easily and intuitively switch between or select an audio endpoint for an electronic device.

While some examples disclosed herein have discussed switching between use of onboard audio endpoints (e.g., microphones 24 and speaker 26) and external audio endpoints (e.g., microphone 42 and speaker 44), it should be appreciated that the disclosed systems and methods may be utilized to switch between use of multiple (e.g., a plurality of) onboard audio endpoints (e.g., multiple onboard speakers and/or microphones), and between use of multiple (e.g., a plurality of) external audio endpoints (e.g., multiple external speakers and/or microphones) by recognizing gestures of a user.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the discussion above and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
an image sensor;
a plurality of audio endpoints, the plurality of audio endpoints including a plurality of audio output endpoints and a plurality of audio input endpoints; and
an electronic device comprising a controller, wherein the controller is to:
receive images of a user's face from the image sensor;
detect, in the images, a gesture of the user to point to a feature on the user's face; and
transition between use of the plurality of audio output endpoints and between use of the plurality of audio input endpoints in response to detecting the gesture of the user simultaneously pointing to a first feature and a second feature on the user's face such that one of the plurality of audio endpoints is activated and another of the plurality of audio endpoints is deactivated.

2. The system of claim 1, wherein the plurality of audio output endpoints comprises an onboard speaker of the electronic device and an external speaker coupled to the electronic device.

3. The system of claim 2, wherein the plurality of audio input endpoints comprises an onboard microphone and an external microphone coupled to the electronic device.

4. The system of claim 1, wherein the controller is to detect the gesture in the images using a neural network.

5. The system of claim 1, wherein the controller is further to provide an indication to the user after the transition in response to detecting the gesture.

6. The system of claim 1, wherein the controller is further to detect, in the images, the feature on the user's face using a machine-learning model.

7. The system of claim 1, wherein the one of the plurality of audio endpoints that is activated is an external audio endpoint, external from the electronic device, and the another of the plurality of audio endpoints that is deactivated is an onboard audio endpoint, integrated with the electronic device.

8. A non-transitory machine-readable medium storing instructions, which, when executed by a processor of an electronic device, cause the processor to:
detect a first feature of a user's face and a second feature of the user's face in images captured by an image sensor coupled to the electronic device;
detect, in the images, a gesture of the user to indicate the first feature;
select, among a plurality of audio endpoints coupled to the electronic device, a first audio output endpoint for activation and use in response to detecting the gesture to indicate the first feature;

detect, in the images, a gesture of the user to indicate the second feature; and select an audio input endpoint for use in response to detecting the gesture to indicate the second feature.

9. The non-transitory machine-readable medium of claim 8, wherein the electronic device is coupled to a second audio output endpoint among the plurality of audio endpoints, and wherein the instructions, when executed by the processor, cause the processor to switch to the first audio output endpoint from the second audio output endpoint in response to detecting the gesture.

10. The non-transitory machine-readable medium of claim 9, wherein the instructions, when executed by the processor, cause the processor to:

detect, in the images, the gesture after switching to the first audio output endpoint; and, in response, switch from the first audio output endpoint to the second audio output endpoint.

11. The non-transitory, machine-readable medium of claim 8, wherein the first feature comprises an ear, and the second feature comprises a mouth.

12. The non-transitory machine-readable medium of claim 8, wherein the instructions, when executed by the processor, further cause the processor to provide an indication to the user upon selecting the first audio endpoint for use in response to detecting the gesture.

13. An electronic device, comprising:

a housing;

an image sensor;

an onboard audio endpoint that is integrated with the housing;

a communication assembly to communicatively couple with an external audio endpoint that is separate from the housing; and a controller positioned within the housing, wherein the controller is to:

detect a first facial feature of a user using the image sensor;

detect a first gesture of the user using the image sensor, in which the user points to the first facial feature; and switch between use of the onboard audio endpoint and the external audio endpoint, via the communication assembly, in response to detecting the first gesture.

14. The electronic device of claim 13, comprising:

a second onboard audio endpoint that is integrated with the housing; and a second external audio endpoint that is to be communicatively coupled to the communication assembly, wherein the controller is to:

detect a second facial feature of the user using the image sensor; and detect a second gesture of the user using the image sensor, in which the user points to the second facial feature; and switch between use of the second onboard audio endpoint and the second external audio endpoint, via the communication assembly, in response to detecting the second gesture.

15. The electronic device of claim 14, wherein the controller is to:

detect both the first gesture and the second gesture simultaneously; and switch between use of the onboard audio endpoint and the external audio endpoint and between use of the second onboard audio endpoint and the second external audio endpoint in response to detecting the first gesture and the second gesture simultaneously.

16. The electronic device of claim 13, wherein the controller is to detect the first facial feature and the first gesture using a neural network.

17. The electronic device of claim 13, wherein the onboard audio endpoint comprises an onboard speaker and the external audio endpoint comprises a speaker on a headset.

* * * * *